July 25, 1950  R. KRESS ET AL  2,516,397
CONTROL PEDAL ASSEMBLY
Filed Dec. 7, 1946  2 Sheets-Sheet 1

INVENTOR.
RALPH KRESS
GALE GRISWOLD
BY
Richard W. Treverton
ATTORNEY

July 25, 1950  R. KRESS ET AL  2,516,397
CONTROL PEDAL ASSEMBLY

Filed Dec. 7, 1946  2 Sheets-Sheet 2

INVENTOR.
RALPH KRESS
BY GALE GRISWOLD
Richard W. Treverton
ATTORNEY

Patented July 25, 1950

2,516,397

UNITED STATES PATENT OFFICE 2,516,397

CONTROL PEDAL ASSEMBLY

Ralph Kress and Gale Griswold, Columbus, Ohio, assignors to Curtiss-Wright Corporation, a corporation of Delaware Application December 7, 1946, Serial No. 714,878

7 Claims. (Cl. 74—478)

This invention relates to an improved control pedal assembly for airplanes and other devices.

Objectives of the invention reside in the provision of an improved assembly which has pedals arranged to accomplish dual control functions, such as the operation of an airplane rudder and wheel brakes; which may be installed as a unit; which may be adjusted by a single operation to accommodate operators of different stature; and which in all positions of adjustment or operation maintains the pedals properly aligned with the operator's feet.

These and other objects and advantages of the invention will become apparent from the following description of the typical embodiment shown in the accompanying drawings, wherein.

Figure 1:
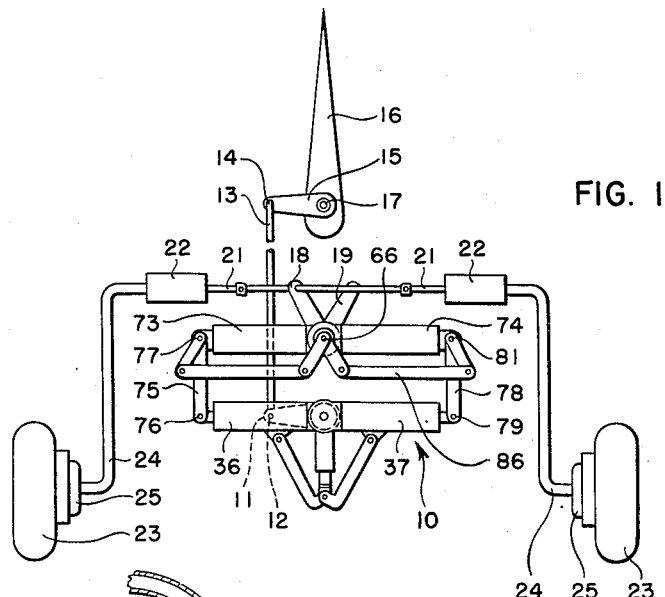
Figure 1 is a simplified diagrammatic plan view showing the relationship of the control pedal assembly to the wheel brakes and rudder of an airplane.

As shown in Figure 1 the control pedal assembly, indicated generally at 10, has a crank arm 11 pivotally connected at 12 to a link 13. The latter is pivoted at 14 to horn 15 of rudder 16, whereby upon swinging of arm 11 the rudder will be swung about the axis 17 of its hinge connection to the aircraft. The pedal assembly likewise includes a pair of independently movable crank arms 18 and 19, each of which is connected by linkage 21 to an actuating cylinder 22 of the brake system for one of the wheels 23. The actuating cylinders, one for the brake of each wheel 23, are connected by hydraulic lines 24 to the brake mechanisms 25 at the wheels, in a manner well known in the art. The arrangement illustrated is of a kind such that a pull exerted on the right linkage 21 by arm 18 (moving counterclockwise as seen in plan) will apply the right wheel brake, and a similar pull on the other linkage 21, exerted by clockwise movement of arm 19, will apply the left wheel brake.

Figure 4:
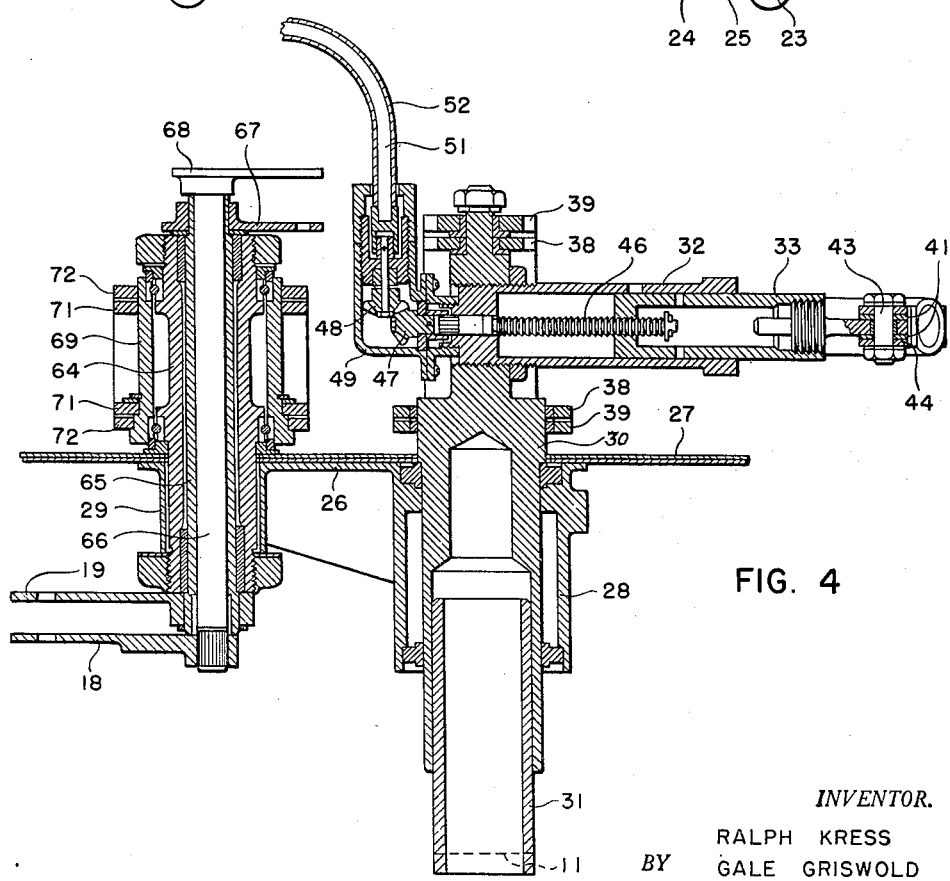
Figure 3:
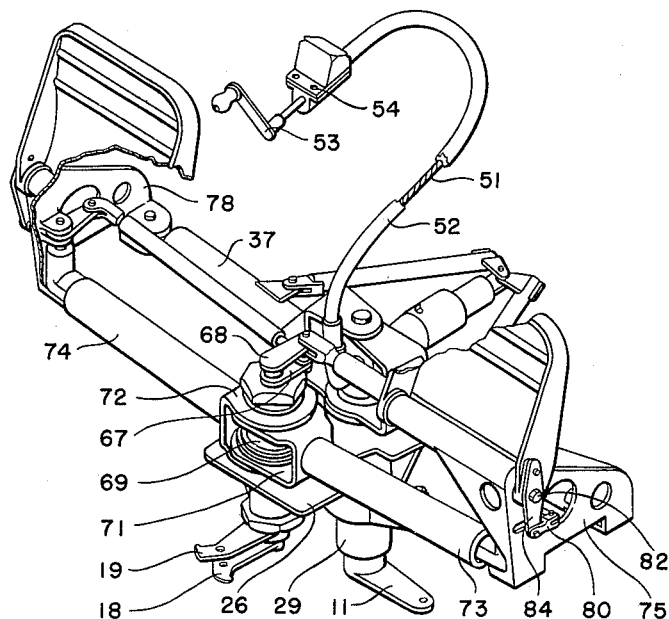
Figures 2 and 3 are isometric views of the control pedal assembly taken from the front and rear, respectively; and, Figure 4 is a longitudinal vertical sectional view of the assembly.
Figure 2:
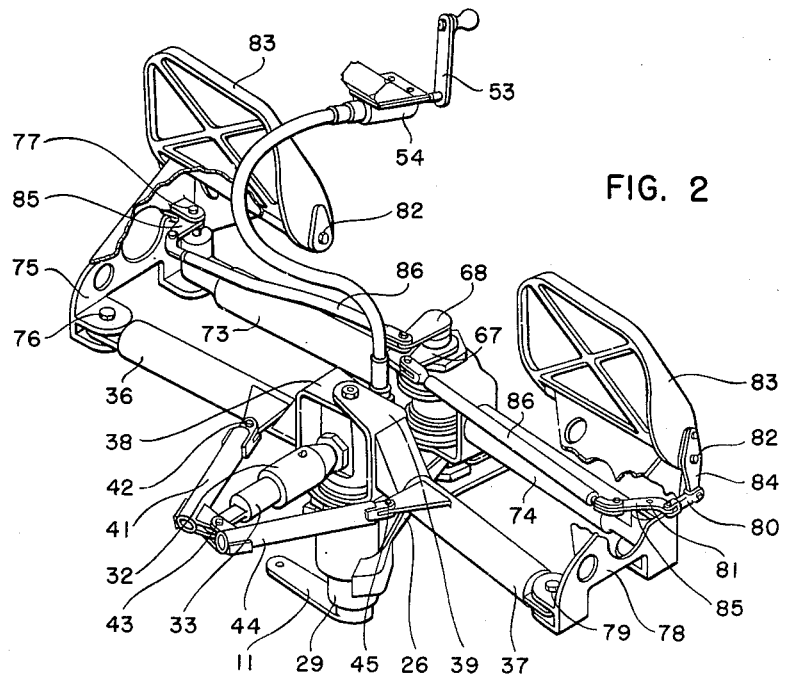

Referring now to Figures 2 to 4, the control pedal assembly 10 includes a base 26 for attachment to a floor or other support indicated at 27 and provided with a front depending tubular part 28 and a rear depending tubular part 29. Part 28 rotatably supports an upright spindle 30 upon whose lower end 31 the crank arm 11 is affixed. Rigid with and extending forwardly from the upper portion of spindle 30 is a tubular member 32 which supports a plunger 33 for telescoping movement. Arms 36 and 37 respectively have bifurcated ends 38 and 39 mounted on suitable bushings on the spindle 30 so that the arms can swing about the upright spindle axis. A link 41 is pivoted at 42 to arm 36 and at 43 to a fitting on the forward end of plunger 33. A similar link 44 is pivoted at 45 to arm 37 and at 43 to plunger 33.

Threaded to the plunger is a screw 46 which is mounted for rotation in suitable bearing means carried by member 32. A bevel gear 47 keyed to the screw is driven by a second bevel gear 48 rotatably mounted within a gear housing 49. Gear 48 is driven by a flexible shaft 51 which extends through a flexible housing 52 and which has an operating crank handle 53. A fitting 54 on the end of housing 52 is adapted to support the handle 53 in a location convenient to the operator, as for example on or beneath the instrument panel in the case of an airplane.

The rear depending tubular part 29 of the base supports a fixed bearing tube 64 in which is journalled a sleeve 65 that in turn journals a spindle 66. Secured to the lower ends of the members 65 and 66 are, respectively, the brake operating arms 19 and 18; and secured to the upper ends of these members are arms 67 and 68, respectively. Supported on tube 64, preferably by antifriction bearings is a sleeve 69 upon which in turn are journalled the bifurcated ends 71 and 72 of arms 73 and 74, respectively.

A right pedal support 75 is pivoted at 76 to the outer end of arm 36 and at 77 to arm 73. Likewise a left pedal support 78 is pivoted at 79 to arm 37 and at 81 to arm 74. To each of supports 75 and 78 there is hinged on a transverse axis at 82 a pedal 83. The pedals extend about pivots 82 and have depending arms 84 that are pivotally connected by short links 80 to bell crank members 85. The latter are mounted on the respective pivots 77 and 81 and are also pivoted to links 86 whose inner ends are connected respectively to arms 68 and 67.

Considering the pedal assembly as a rudder-brake control system for an aircraft, as diagrammatically indicated in Figure 1, it will be seen that bodily forward or rearward movement of the pedals will cause arms 36, 37 to swing as a unit with arm 11 about the axis of spindle 30, and operating through link 13 to operate the rudder 16. During such movement the pedals 83 will be held properly aligned with the pilot's feet since the members 26, 37, 74, 78 and 26, 36, 73, 75 constitute parallelogram linkages. The parts 11, 31, 30 and 32 may be considered together as constituting a rudder control element.

Adjustment to accommodate pilots of different stature is accomplished by merely turning crank 53, which through the operating system heretofore described moves plunger 33 forwardly or rearwardly to adjust the longitudinal position of pedals 83. It will be noted that with a symmetrical arrangement of arms 36, 37 and links 41, 44, the axis of parts 32, 33 will always bisect the angle formed by the axes of arms 36, 37 so that adjustment of the pedals to accommodate persons of longer or shorter leg length will in no wise affect the neutral position of the rudder. During such adjustment the pedals are always held properly aligned, i. e., parallel with the transverse axis of the airplane, by reason of the parallelogram linkages heretofore pointed out.

For operating the brakes, the pedals 83 are swung forwardly about their pivots 82. With reference to Figure 2, it will be seen that such operation to the left pedal will move link 80 to the rear (to the right) causing bell crank 85 and arm 67 to move counterclockwise. This will cause arm 19 also to move counterclockwise, applying the left wheel brake 25 as will be seen from Figure 1. The parts 18, 66 and 68 together may be considered to constitute one brake control element, and the parts 19, 65 and 67 another such control element.

Adjustment of the pedals by turning handle 53 or rudder movement of the pedals will not affect the brake system because the left linkage 67, 86, 85, 74 is also a parallelogram system, as is the right linkage 68, 86, 85, 73. Brake application can therefore be accomplished only by pushing pedal 83 forwardly about its transverse hinge axis 82. In Figure 1 the brake linkage appears in its operated position, with the arms 18, 19 and 67, 68 diverging in order that the lowermost arm of each pair may be seen.

It will be understood that the control pedal assembly may be employed on various devices other than land, water and aircraft, since the pedals may be used for other purposes than directional and brake control if desired. It will also be understood that the assembly specifically shown and described is merely illustrative of the inventive principles involved, and that these principles may be otherwise embodied without departing from the spirit of the invention or from the scope of the appended claims.

We claim:

1. In a control pedal assembly, a base, a pair of pedal supports each having a pedal mounted thereon for tilting movement, a parallelogram linkage for each pedal support connecting it to the base upon substantially upright pivot axes for fore and aft movement relative thereto, adjustable means connecting the parallelogram linkages for adjusting the pedals in a fore and aft direction, a pair of control elements, and a control linkage connecting each pedal with one of said control elements, said control linkage together with said parallelogram linkage defining a second parallelogram linkage system whereby only tilting movement of the pedals will effect movement of the control elements.

2. In a control pedal assembly, a base having a first, second and third control elements pivoted thereto, first and second arm means pivoted intermediate the ends thereof to said base, a pedal support on each side of the base pivoted to the arm means adjacent the ends thereof, each support and the arm means defining with the base a parallelogram system, a member pivoted to each support, a link pivotally connecting one member with the second control element and a link pivotally connecting the other member with the third control element, each link and member together with the associated arm means and control member constituting a parallelogram system, a pedal mounted on each support for movement relative thereto, and means for translating such movement of each pedal into relative movement of the associated member and support.

3. In a control pedal assembly, a base having first, second and third control elements pivoted thereto, first and second sets of arms pivoted to said base on spaced axes, each set comprising two arms extending oppositely to each other laterally of the base, a pedal support on each side of the base pivoted to the arms extending to that side, each support and the arms pivoted thereto defining with the base a parallelogram linkage system, a member pivoted to each support, a link pivotally connecting one member with the second control element and a link pivotally connecting the other member with the third control element, each link and member together with the associated arm and control member constituting a parallelogram linkage system, a pedal mounted for movement on each support, means for translating such movement of each pedal into relative movement of the associated member and support, and means for adjusting the angular relation of the arms to the first control element.

4. In a control pedal assembly, a base having a first control element pivoted thereto on a first substantially upright axis, second and third control elements pivoted to the base on a second axis substantially parallel the first axis, first and second sets of arms pivoted to said base on said first and second axes respectively, each set comprising two arms extending oppositely to each other laterally from the base, a pedal support on each side of the base pivoted to the arms extending to that side, a member pivoted to each support substantially coaxially with the pivot thereto of the arm of the second set, a link pivotally connecting one member with the second control element and a link pivotally connecting the other member with the third control element, a pedal mounted movably on each support, means for translating such movement of each pedal into relative movement of the associated member and support, and means for adjusting the angular relation of the arms of the first set to the first control element.

5. In a control pedal assembly, a base having a first control element pivoted thereto on a first substantially upright axis, second and third control elements pivoted to the base on a second axis parallel the first axis, first and second sets of arms pivoted to said base on said first and second axes respectively, each set comprising two arms extending oppositely to each other laterally from the base, a pedal support on each side of the base pivoted to the arms extending to that side, each support and the arms pivoted thereto defining with the base a parallelogram system, a member pivoted to each support substantially coaxially with the pivot thereto of the arm of the second set, a link pivotally connecting one member with the second control element and a link pivotally connecting the other member with the third control element, each link and its member together with the associated arm and control element constituting a parallelogram system, a pedal mounted on each support for pivotal movement about a substantially transverse axis, means for translating pivotal movement of each pedal into relative movement of the associated member and support, and means for simultaneously adjusting the angular relation of both arms of the first set to the first control element.

6. In an aircraft rudder and brake control pedal assembly, the aircraft having a rudder control element pivoted thereto on a first substantially upright axis, two brake control elements pivoted to the base on a second axis parallel the first axis, first and second sets of arms pivoted to said base on said first and second axes respectively, each set comprising two arms extending oppositely to each other laterally from the base, a pedal support on each side of the base pivoted to the arms extending to that side, each support and the arms pivoted thereto defining with the base a parallelogram system, a member pivoted to each support substantially coaxially with the pivot thereto of the arm of the second set, a link pivotally connecting one member with one brake control element and a link pivotally connecting the other member with the other brake control element, each link and member together with the associated arm and brake control element constituting a parallelogram system, a pedal mounted on each support for pivotal movement about an axis substantially transverse of the aircraft, means for translating pivotal movement of each pedal into relative movement of the associated member and support, and means for simultaneously adjusting the angular relation of both arms of the first set to the rudder control element.

7. In a control pedal assembly, a base, a pedal support and a pedal mounted for tilting movement on the support, parallel links pivotally connected upon substantially upright pivot axes to the support and to the base and defining therewith a parallelogram linkage system, a control element pivotally mounted on the base, and a control linkage connecting said pedal and pedal support and control element, said control linkage together with one of said parallel links defining a second parallelogram linkage system whereby only tilting movement of the pedal will effect movement of the control element relative to the base.

RALPH KRESS.
GALE GRISWOLD.

REFERENCES CITED

The following references are of record in the file of this patent:

UNITED STATES PATENTS

| Number | Name | Date |
| --- | --- | --- |
| 2,420,528 | Eaton, Jr., et al. | May 13, 1947 |
| 2,424,523 | Watter | July 22, 1947 |

FOREIGN PATENTS

| Number | Country | Date |
| --- | --- | --- |
| 668,292 | Germany | Nov. 30, 1938 |
| 526,026 | Great Britain | Sept. 10, 1940 |